United States Patent [19]

Tucker

[11] Patent Number: 4,529,053
[45] Date of Patent: Jul. 16, 1985

[54] UNIVERSAL BATTERY TRAY

[76] Inventor: Walter R. Tucker, 20 Maple St., Deposit, N.Y. 13754

[21] Appl. No.: 452,841

[22] Filed: Mar. 7, 1983

[51] Int. Cl.³ .............................................. B62D 25/00
[52] U.S. Cl. .................................. 180/68.5; 206/335; 248/503
[58] Field of Search ....................... 180/68.5; 206/335; 248/300, 287, 503, 558

[56] References Cited

U.S. PATENT DOCUMENTS

| 2,710,660 | 6/1955 | Coleman | 248/503 |
| 3,082,987 | 3/1963 | Robinson | 248/300 |
| 4,327,809 | 5/1982 | Fenstermaker | 206/335 |

FOREIGN PATENT DOCUMENTS

| 2045044 | 3/1972 | Fed. Rep. of Germany | 248/558 |
| 676332 | 7/1952 | United Kingdom | 180/68.5 |

Primary Examiner—David M. Mitchell
Attorney, Agent, or Firm—John W. Young

[57] ABSTRACT

The present invention relates to a battery tray fabricated out of a battery grade polypropylene and structured to be adapted to a plurality of different sized batteries.

1 Claim, 2 Drawing Figures

1

UNIVERSAL BATTERY TRAY

BACKGROUND

The advent of international competition in the automobile industry has produced not only a variety of different sized motor vehicles, but has engendered and produced use of motor vehicles for longer periods of time. As discussed in the U.S. patent to M. Fenstermacher, U.S. Pat. No. 4,327,809, while original equipment is initially sufficient, use over a long period of time creates problems that require replacement. The problems generated are basically inherent in the nature of the use of the battery and the composition of battery retaining plate. It is obvious that battery acid and cold rolled steel are incompatible substances over extended periods of time. It is further obvious that because of the variety of battery sizes there is a requirement for a replacement tray that will be adaptable to all conventional battery sizes and, additionally, be resistant to the deterioration encountered with the conventional cold rolled steel or metalic battery tray.

It is an object of this invention to provide a single or universal replacement battery tray which will be resistant to the corrosive battery acid, and which can be readily and easily cut, trimmed, shaped or reduced to be adapted to any particular vehicle, and/or any particular battery.

It has been found that by constructing the retaining tray from a battery grade polypropyline that not only is the tray resistant to the corrosive effect of the battery acid, but provides a tray that can be readily trimmed or shaped to accomodated the tray to the particular vehicle and battery.

In the preferred embodiment of the invention, which is somewhat similar to but more versatile than the apparatus disclosed by Fenstermacher, the base portion of the tray is fabricated to provide at least four recessed wells, three of which contain circular centering holes together with a pair of longitudinal slots; the remaining well containing a slot running perpendicular to said longitudinal slots. Again the tray is fabricated of battery grade polypropolene which not only is resistive to the battery acid, but which will not frictionally interact with the battery case upon use. The battery is fastened to the tray by virtue of the plurality of rectangular apertures extending through the upper ledge of the base and arranged on opposite side of the tray. Thus, by providing a minimum of four wells in the sequence as shown, and further by inserting and providing the plurality of fastening apertures in the base of the tray, a universal tray device is achieved and secured that may be utilized in most conventional vehicles, eliminating the necessity for a similiar device for each conventional vehicle.

These and other objects of the present invention will become immediately apparent from the following detailed description in conjunction with the accompanying drawings.

BRIEF DESCRIPTION OF DRAWINGS

Referring now to the drawings, FIG. 1 depicts the preferred embodiment of the universal adjustable battery tray 1. As it was briefly mentioned, the tray is fabricated out of battery grade polypropylene which not only prossesses the necessary strength and acid resistive characteristics desired for such use, but further, is readily trimmable to adjust to the specific required parameters. The preferred embodiment tray 10 is rectangular in form and is provided with four recessed wells, 2, 3, 4 and 5, three of which, 2, 3 and 5, are equal in width (2.37 inches); the fourth of which is approximately twenty-five percent larger (2.91 inches). Additionally, the three wells, 2, 3 and 5, are co-equal in length, 4.69 inches, while the fourth is 5.5 inches in length. A pair of slots, 6 and 7, 6' and 7', 6" and 6"' and 7"', are implaced in each well 2, 3 4 and 5. Well 4 is constructed with a fastening slot 8 in the center thereof and designed to be the fastening aperture connecting the tray to the body frame, wells 2, 3 and 5 are provided with circular fastening apertures 12, 13 and 14. It is apparent, depending on the location of the tray fastening devise on the car, that the tray may be reversed, end to end, making it suitable for attachment to almost every conventional vehicle, car or truck.

Figure 1:
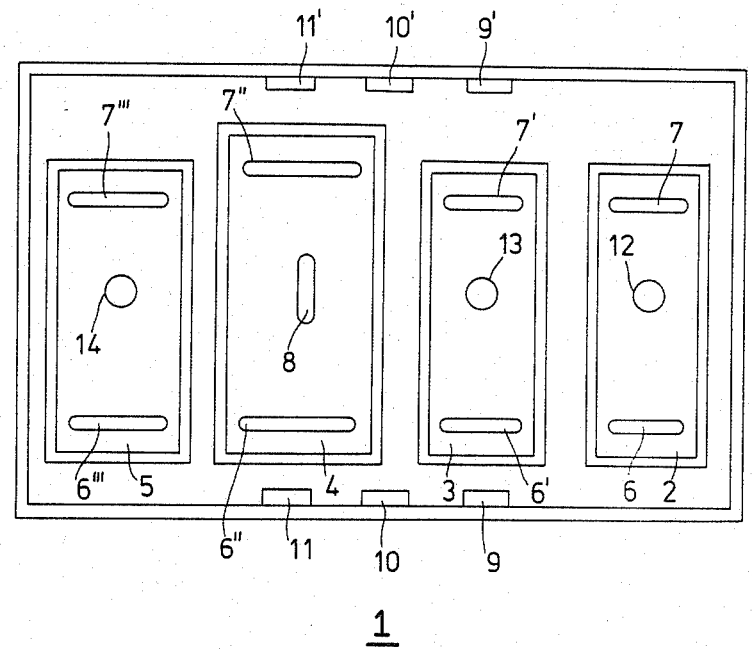
FIG. 1 is a top view of the preferred embodiment of the battery tray.
Figure 2:
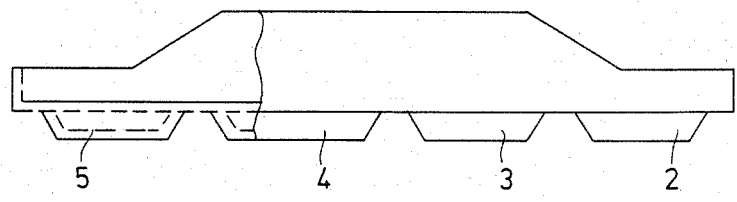
FIG. 2 is a side view of the battery tray with portions broken away to more clearly disclose the recessed wells.

A further plurality of locking slots, 9 and 9', 10 and 10', 11 and 11', are provided along the longitudinal edges of tray 1 and provide the mechanism for securing the battery to the tray. It is apparent, depending upon the length of the battery inserted, that a particular pair of locking slots 9 and 9', 10 and 10', 11 and 11', will be utilized to secure the battery to the tray by a conventional locking means such as shown by the patent to Fenstermacher. It is further evident that additional locking slots may be provided without departing from the scope of this invention. Further, since the tray is fabricated from the polypropylene it is evident that the slot may be widened or extended without difficulty to achieve a tighter fit if it is so desired.

Although a preferred embodiment of the invention has been described, it will be apparent to those skilled in the art that there are many variations and modifications which may be made without departing from the scope of this invention; therefore the invention is not to be limited by the specific disclosure of a preferred embodiment, but only by the appended claims.

What is claimed is:

1. A universal battery tray for the storage of a motor vehicle battery including a rectangular polypropylene base portion having at least four rectangular longitudinally spaced well areas, three of said well areas, including the well area at each end, being of equal dimensions, said wells of equal dimensions each having a circular aperture at the intersection of the midpoints of their sides, said fourth well being of a greater width and length and having a slot extending through the center point of said rectangle; and, a plurality of locking apertures extending through said base portion of said tray, the apretures of each pair being located in symmetrical opposition to each other for use as a housing for a battery locking device, whereby a singular or universal battery tray is achieved which is adaptable to a plurality of conventional motor vehicles.

* * * * *